C. E. MOORE.
RIM, TIRE, AND WHEEL CARRIER FOR AUTOMOBILES.
APPLICATION FILED AUG. 6, 1919.
1,327,626.
Patented Jan. 13, 1920.
2 SHEETS—SHEET 1.
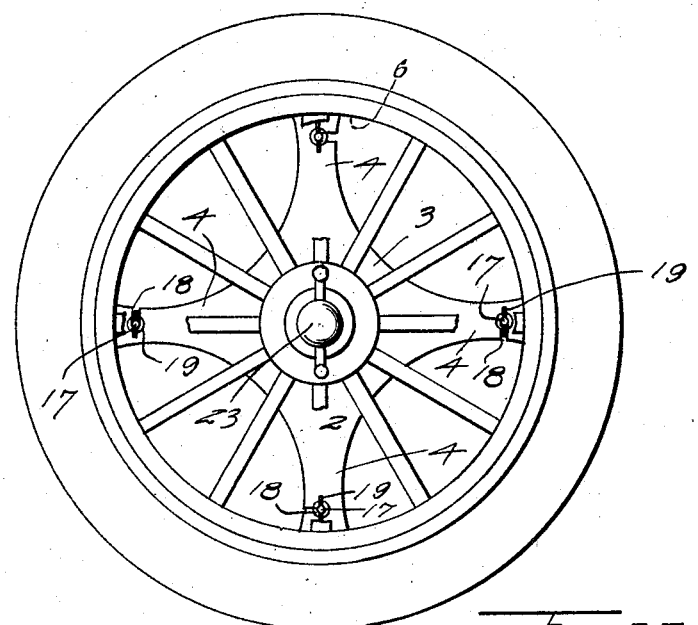
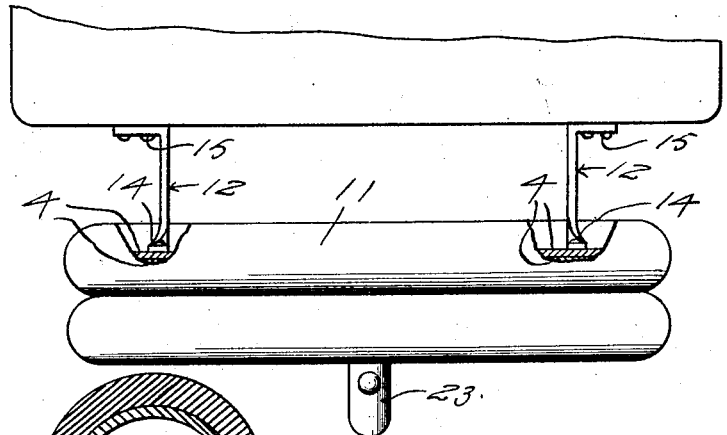
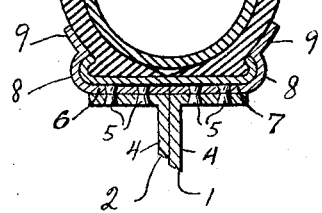
Inventor
C. E. Moore
By Watson E. Coleman
Attorney

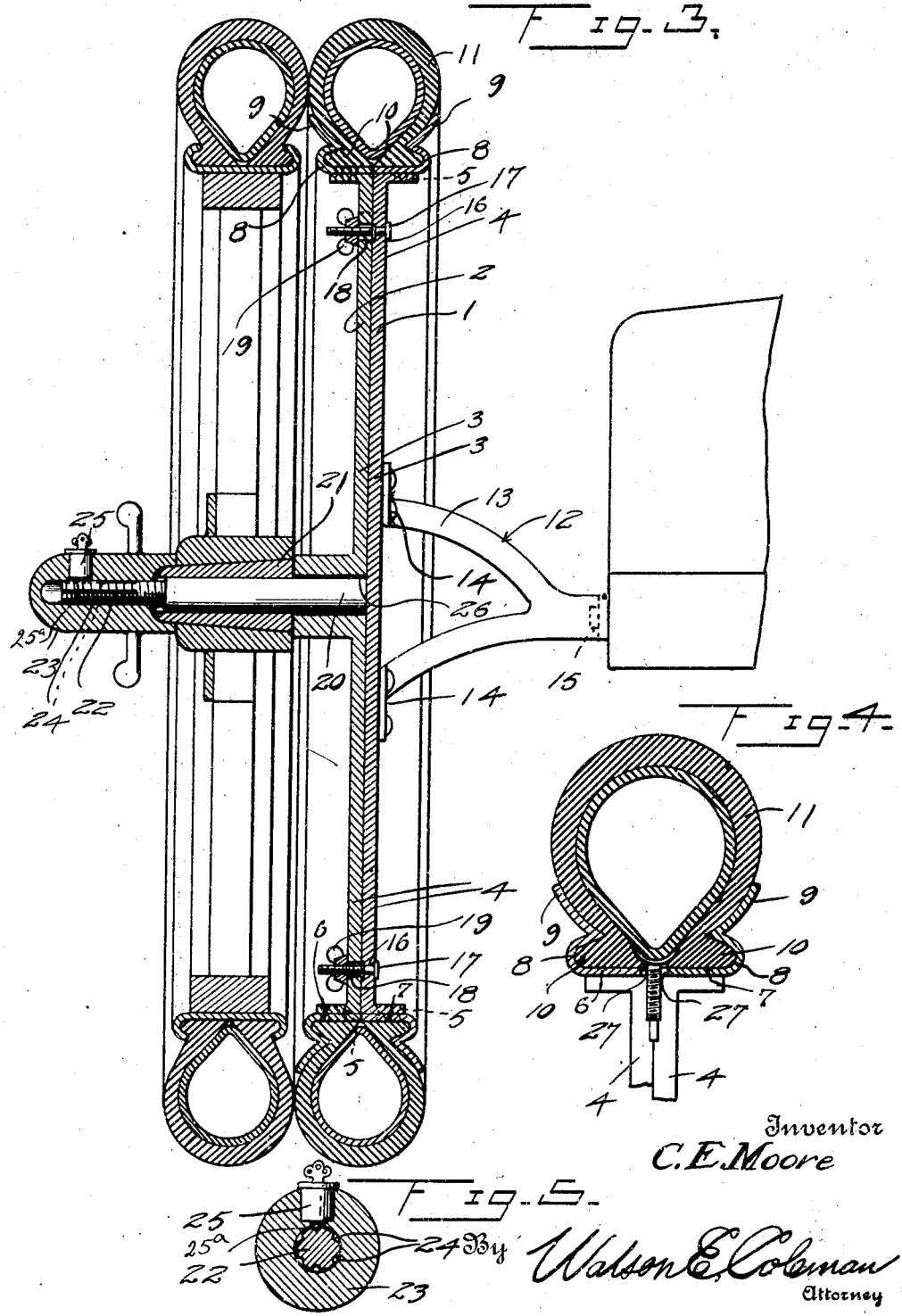

UNITED STATES PATENT OFFICE.

CHARLES E. MOORE, OF TERRE HAUTE, INDIANA.

RIM, TIRE, AND WHEEL CARRIER FOR AUTOMOBILES.

1,327,626.     Specification of Letters Patent.     Patented Jan. 13, 1920.

Application filed August 6, 1919. Serial No. 315,696.

*To all whom it may concern:*

Be it known that I, CHARLES E. MOORE, a citizen of the United States, residing at Terre Haute, in the county of Vigo and State of Indiana, have invented certain new and useful Improvements in Rim, Tire, and Wheel Carriers for Automobiles, of which the following is a specification, reference being had to the accompanying drawings.

This invention relates to an improved combination rim, tire and wheel carrier for attachment to the rear of an automobile, though not necessarily, for it may be attached to any other part of the automobile to which it may be applicable.

As one of the objects of the invention, it is the aim to provide a carrier of this kind, which can support and carry an extra clencher tire, or a straight edge tire with rim, in addition to the extra wheel and tire which is carried upon the spindle of the carrier.

A further general object of the invention is the provision of a carrier of this kind, which is very simple, efficient and practical in construction, and may be manufactured at a relatively low cost and sold at a reasonable profit.

The invention further aims to provide a carrier comprising two sections, and means for holding the sections concentrically together, and constructed to support and carry an extra clencher tire and rim, or straight edge tire and rim, in combination with a spindle on one of the sections to support a wheel, which also carries a rim and tire, there being means for holding the wheel on the spindle.

A further object of the invention is the provision of a carrier consisting of two sections, each section having a detachable web, the web of one section carrying bolts to engage notches of the web of the other section, in combination with means on the bolts for holding the two sections in place.

While the design and construction at present set forth and illustrated is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a rear view of a portion of an automobile, showing the improved rim and wheel carrier applied, and constructed in accordance with the invention.

Fig. 2 is a plan view of the same.

Fig. 3 is a vertical sectional view showing the detail construction of the spindle, the sleeve and the manner of supporting the wheel and the sleeve on the spindle and also the manner of holding the tire on the carrier.

Fig. 4 is an enlarged detail cross-sectional view through a portion of the rim of the carrier, showing the tire supported in place on the carrier.

Fig. 5 is an enlarged detail sectional view through a portion of the spindle and the sleeve showing the locking means on the end of the spindle.

Fig. 6 is a detail sectional view through a portion of the rim of the carrier, showing a substantially straight edge rim mounted on the carrier, and also showing a tire.

Referring more especially to the drawings, 1 and 2 designate a pair of webs, each of which comprises a body 3 and radial arms 4, which constitute spokes. The outer ends of the arms or spokes are secured at 5 to the annular members 6 and 7. Each member is shaped in cross-section to form an annular recess 8 and a curved flange 9. When the annular members are brought together, as shown in the drawings, the recesses 8 are designed to receive clencher flanges 10 of the tire 11, as shown in the cross-sectional view of the drawings. Suitable brackets 12 have their forks 13 secured at 14 to one of the webs of the carrier, and their shanks are secured at 15 to the automobile at any suitable location, so as to support one of the webs, which in turn supports the other web. The spokes or arms 4 of the web 1 have connected thereto as at 16, threaded rods 17. These rods 17 engage the elongated notches 18 of the arms or spokes of the web 2, there being wing nuts 19 threaded on the rods 17, so as to clamp and draw the webs 1 and 2 toward each other, consequently acting to draw the adjacent edges of the annular members toward each other. In this manner, the clencher flanges of the tire and a portion of the tire may be clamped securely and firmly between the annular members so as to prevent displacement or rattling of the parts.

The web 1 is provided with centrally disposed spindle 20, which is designed to receive a sleeve 21. When it is desired or found necessary to carry a wheel (which may also carry a rim and the tire), the bore of the hub of the wheel telescopes the sleeve, which is on the spindle. The spindle is provided with a reduced extension 22, which is threaded, and engaging the extension is a locking nut 23. The end portion of the extension is provided with a plurality of slots or grooves 24, any one of which is designed to be engaged by a locking member 25, which is carried by the locking nut, thereby preventing the nut from displacement. The sleeve 21, which is mounted upon the spindle has its outer portion extending slightly beyond the hub of the wheel, which is carried upon the sleeve. The locking nut at its open end is large enough to telescope over the projecting end of the sleeve, and contact with the hub of the wheel, thereby holding the hub in contact with the web 2, which is fitted over the spindle prior to telescoping the sleeve on the spindle. In fact, the spindle 20 passes through a central opening 26 in the web 2, then the sleeve is telescoped on the spindle. The wheel to be supported is then arranged on the sleeve, and as previously stated, the locking nut telescopes over the projecting end of the sleeve and clamps the hub of the wheel in place, thereby preventing rattling of the various parts. The corresponding walls of the annular recesses 8 of the annular members 6 and 7 are provided with semi-circular notches 27, which, when the annular members 6 and 7 are brought together form an opening for the reception of the check valve controlled inflating tube of the tire.

As will be noted, a wheel may be carried on the sleeve of the spindle, and at the same time an extra clencher tire may be supported on and between the annular members 6 and 7. Also, if desired, a straight edge tire with rim may be carried by and between the annular members 6 and 7, instead of the clencher tire. By this construction of device, it is obvious that an extra wheel can be supported by the carrier, or rather the spindle thereof, besides carrying an extra tire and rim.

The locking device 25 is in the form of a Yale lock or any other conventional form of lock adapted to receive a key, whereby when the lock is actuated, the locking bolt 25ª may be extended, so as to engage any one of the plurality of slots or grooves 24, thereby preventing the locking nut 23 from rotating, that is, unscrewing.

The invention having been set forth, what is claimed as new and useful is:

1. In a combined wheel and tire carrier, the combination with a pair of annular members concentrically arranged and provided with adjacent annular recesses adapted for the reception of the clencher flanges of a tire, which may be supported between the members, of web members supporting the annular members, brackets connected to one of the web members and secured to the automobile, means for clamping the webs together, a spindle carried by one of the webs and having means to be engaged by the hub of a wheel to be carried, and means on the spindle to hold the hub of the wheel in place.

2. In a combined wheel, tire and rim carrier, the combination with a pair of webs provided with annular members for clamping a clencher tire, means connected to one of the webs and carried by the automobile to support the carrier, one of the webs having a spindle, a sleeve telescopically fitting the spindle, the end of the spindle having a reduced extension, and means threaded on the extension and having a portion telescoping over the sleeve to clamp the hub of a wheel on the sleeve of the spindle.

3. In a combined wheel, tire and rim carrier, the combination with a pair of webs provided with annular members for clamping a clencher tire, means connected to one of the webs and carried by the automobile to support the carrier, one of the webs having a spindle, a sleeve telescopically fitting the spindle, the end of the spindle having a reduced extension, and locked means detachably connected to the extension and having a portion telescoping over the sleeve to clamp the hub of a wheel on the sleeve of the spindle.

4. In a combined wheel, rim and tire carrier, the combination with a pair of webs having spokes, of annular members carried by the webs concentrically to support a tire, means for clamping the webs together, comprising threaded bolts carried by the spokes of one of the webs, the spokes of the other web having notches to receive said bolts without the removal of its nuts, and means on the bolts for drawing the webs together, and means carried by the automobile and connected to one of the webs to support the carrier in place.

5. In a combined wheel, rim and tire carrier, the combination with a pair of annular members, of a pair of webs correspondingly shaped and constructed arranged adjacent each other, the outer ends of the arms of said webs having laterally and oppositely extending parts, to which said annular members are secured, brackets to be carried by the vehicle body and connected to one of the webs for supporting the same, said webs having slot and bolt connections for detachably connecting them, one of said webs having an opening and a hub, the other web having a spindle projecting through the opening and the hub and provided with a threaded spindle extension, a tapered sleeve on the spindle in contact with the hub and adapted to pass through the hub of a wheel and protrude beyond the hub of the wheel and beyond a shoulder at the junction where the extension joins the spindle, and a device detachably located on said threaded extension and engaged with the hub and the sleeve to hold the hub of the wheel and the sleeve in contact with the hub of the web.

In testimony whereof I hereunto affix my signature in the presence of two witnesses.

CHARLES E. MOORE.

Witnesses:
MANFORD E. CASE,
DANIEL I. NEWPORT.